May 12, 1970         B. J. HAWKINS         3,510,961

EDUCATIONAL DEVICES

Filed July 3, 1967         5 Sheets-Sheet 1

BARBARA J. HAWKINS
INVENTOR

ATTORNEYS

May 12, 1970   B. J. HAWKINS   3,510,961
EDUCATIONAL DEVICES

Filed July 3, 1967   5 Sheets-Sheet 2

BARBARA J. HAWKINS
INVENTOR

Huebner & Worrel
ATTORNEYS

May 12, 1970   B. J. HAWKINS   3,510,961
EDUCATIONAL DEVICES

Filed July 3, 1967   5 Sheets-Sheet 3

BARBARA J. HAWKINS
INVENTOR

Huebner & Worrel
ATTORNEYS

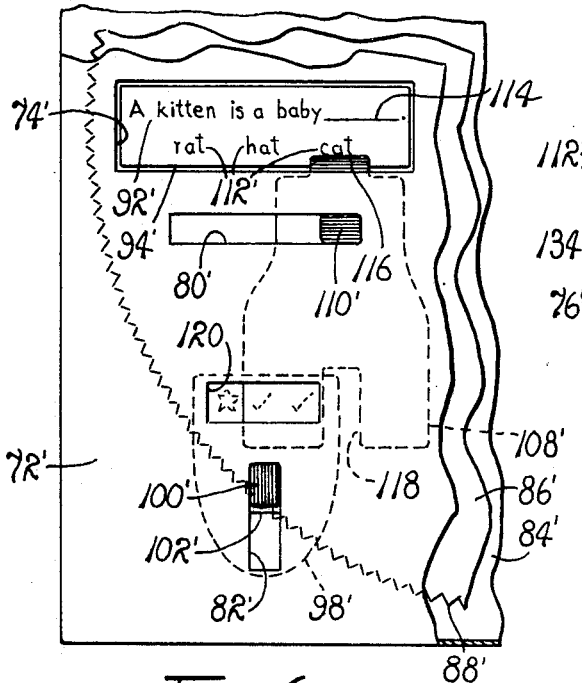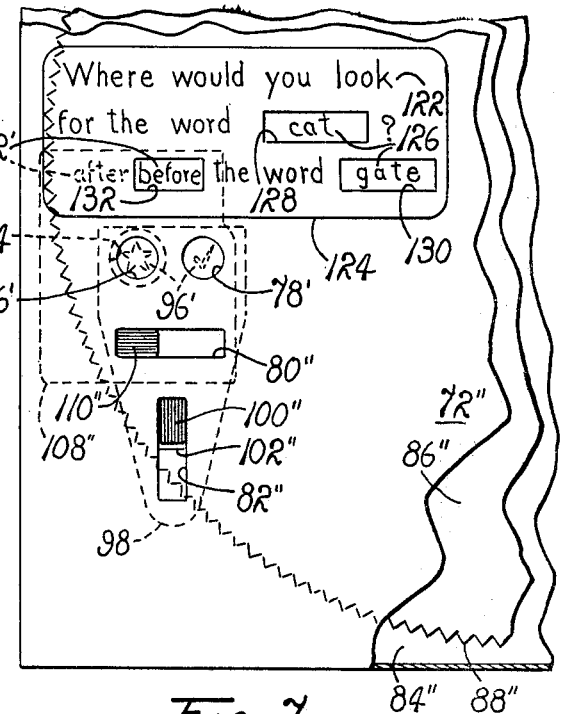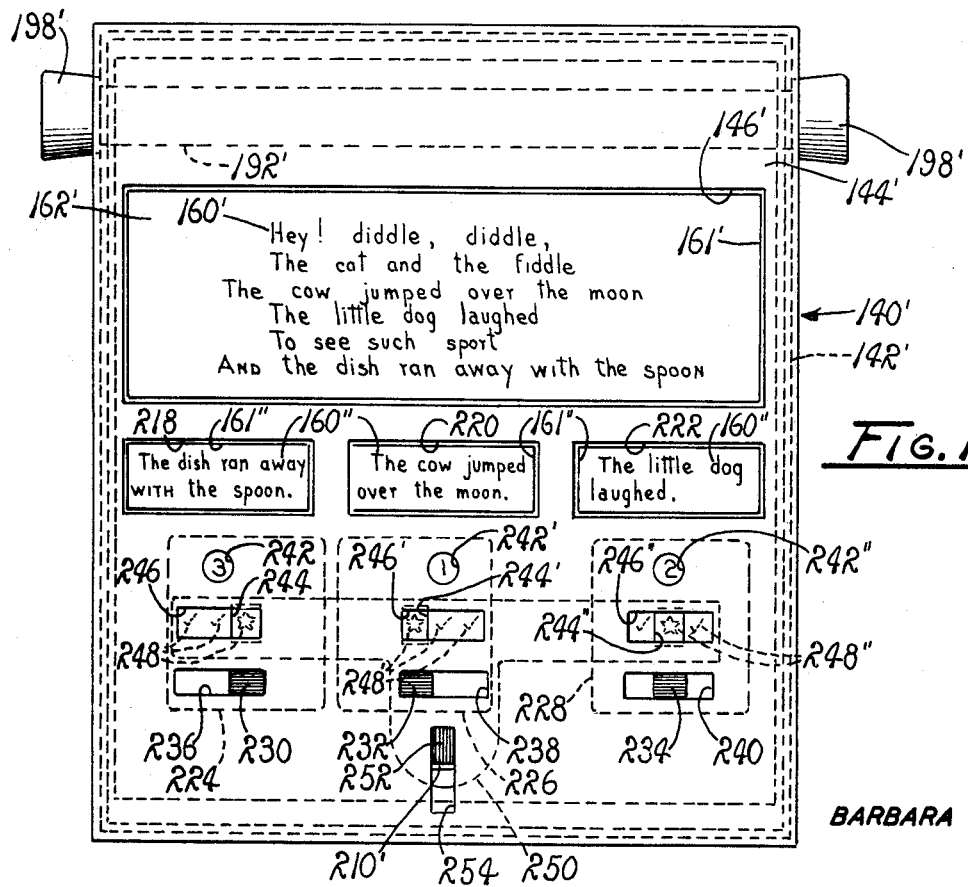

May 12, 1970  B. J. HAWKINS  3,510,961
EDUCATIONAL DEVICES
Filed July 3, 1967  5 Sheets-Sheet 5
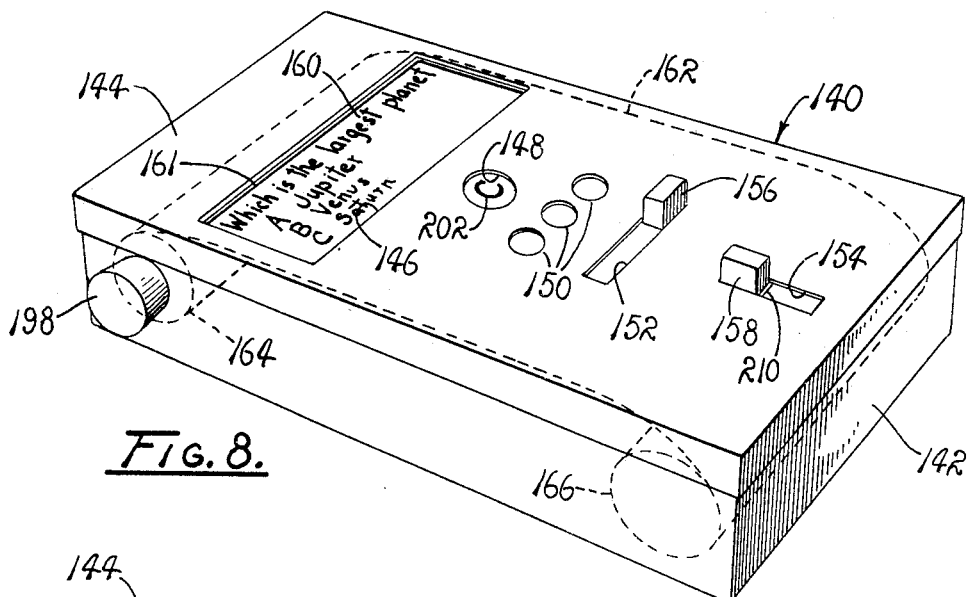
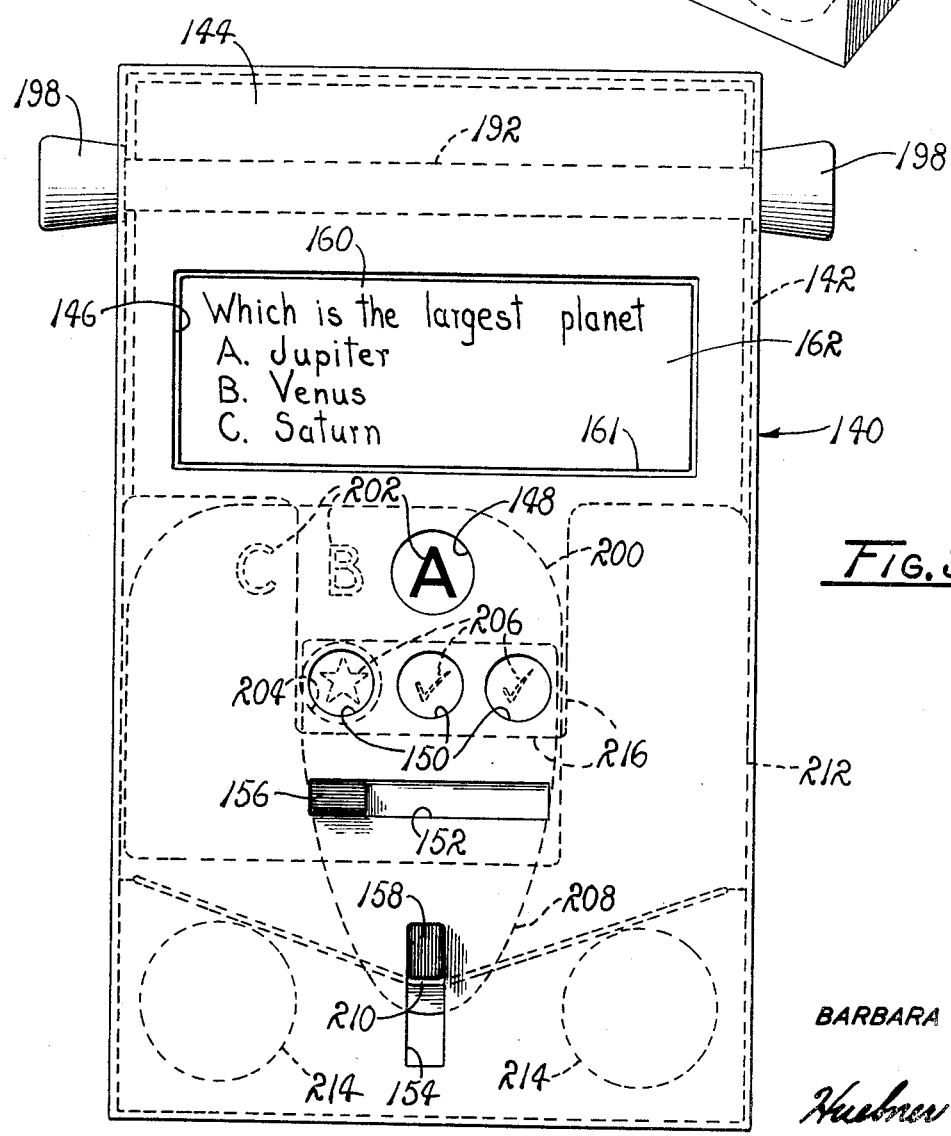
BARBARA J. HAWKINS
INVENTOR
Huebner & Worrel
ATTORNEYS United States Patent Office 3,510,961
Patented May 12, 1970

3,510,961
EDUCATIONAL DEVICES
Barbara J. Hawkins, 1622 Clinton Ave.,
Fresno, Calif. 93704
Filed July 3, 1967, Ser. No. 654,673
Int. Cl. G09b 3/06
U.S. Cl. 35—9                           15 Claims

ABSTRACT OF THE DISCLOSURE

A plurality of layers of material made of economical and readily available materials, such as cardboard, fiberboard, sheet plastic, plasticized paper, and the like, which present problem, answer and answer checking indicia for registration with windows in a cover, and slides therebetween providing for successive inspection of a problem, selection of an answer to the problem, and for unmasking the answer checking indicia for testing the accuracy of the answer selected. In one form, the problem and answer checking indicia are presented on a rotatable disk; in another form, on a scroll of paper.

BACKGROUND OF THE INVENTION

The present invention relates to educational devices and more particularly to educational games adapted to present a variety of predetermined problems to a student, to permit the student to register his reactions to the problems, and to enable the student through simple manipulation of the devices to check the accuracy of the answers registered so that proper memory bonds may be strengthened and inappropriate responses readily detected and eliminated.

Improvements in teaching techniques have resulted in the development of a number of educational games having as their principal objective motivation of the student and securing his interest in the performance of learning exercises selected to develop a skill or to impart a knowledge desired. The present invention relates to this general class of educational games but seeks to provide improvements.

SUMMARY OF THE INVENTION

It is therefore an object of the present invention to provide an improved educational game directed to motivation of the student and to the attainment of student interest in learning exercises to be performed.

Another object is to provide an educational game adapted to self-teaching repetition of the learning exercises and student verification of the accuracy of exercise performance.

A further object is to provide a device of the character described in which problems and answers are visually presented in such close proximity that they are visible as an entity or unitary pattern conducive to the establishment of an accurate memory bond between the problem and the proper answer or solution.

Still another object is to provide an educational device which is simple to construct and adapted to fabrication from abundant economical materials such as cardboard, fiberboard, sheet plastic material, plasticized paper, and the like.

A still further object is to provide an educational device posing selective problems in a variety of ways to secure student interest and motivation.

For the attainment of the aforementioned objects and other advantages, the present invention contemplates and is concerned with forms of educational devices in which several strata or layers of material, relatively movable with respect to each other, to present a problem, to accommodate the registering of an answer, and to check the answer registered. In one form, the invention includes a rotatable disk having problem and answer checking indicia thereon registrable with windows in a cover and answer selection and checking slides therebetween. In another form, a scroll of paper replaces the disk.

BRIEF DESCRIPTION OF THE DRAWINGS

FIG. 6 is a fragmentary plan view of an educational device somewhat similar to that of FIG. 1 but which poses problems pertaining to the relationship of words;

FIG. 7 is a fragmentary plan view of an educational device somewhat similar to that of FIG. 1 but which poses problems pertaining to the relationship of words;

FIG. 8 is a perspective view of another embodiment of the educational device of the present invention which poses problems having multiple choice answers;

FIG. 9 is a plan view of the educational device of FIG. 8;

FIG. 12 is a plan view of an educational device somewhat similar to that of FIG. 8 but which poses problems relating to the sequential order of phrases or other groups of words.

DESCRIPTION OF THE EMBODIMENTS

Flat forms

Figure 1:
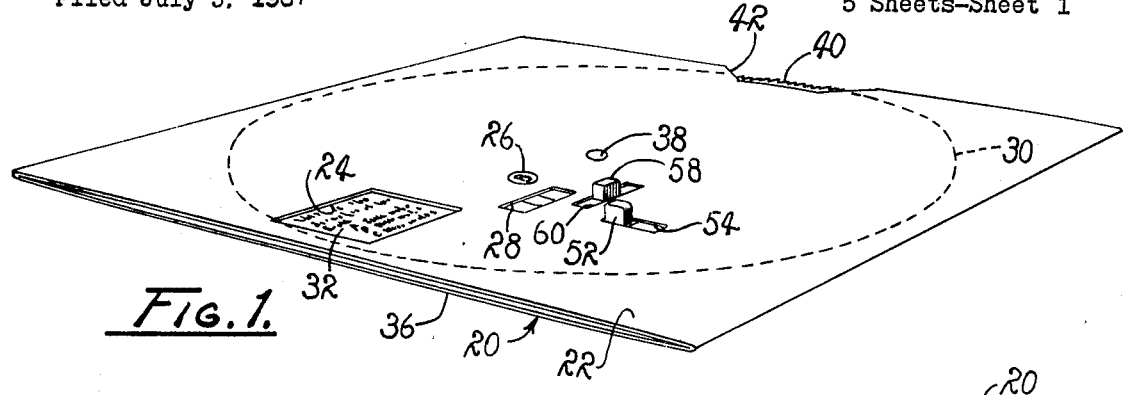
FIG. 1 is a perspective view of one embodiment of the eductional device of the present invention, which poses multiple choice answer problems.
Figure 2:
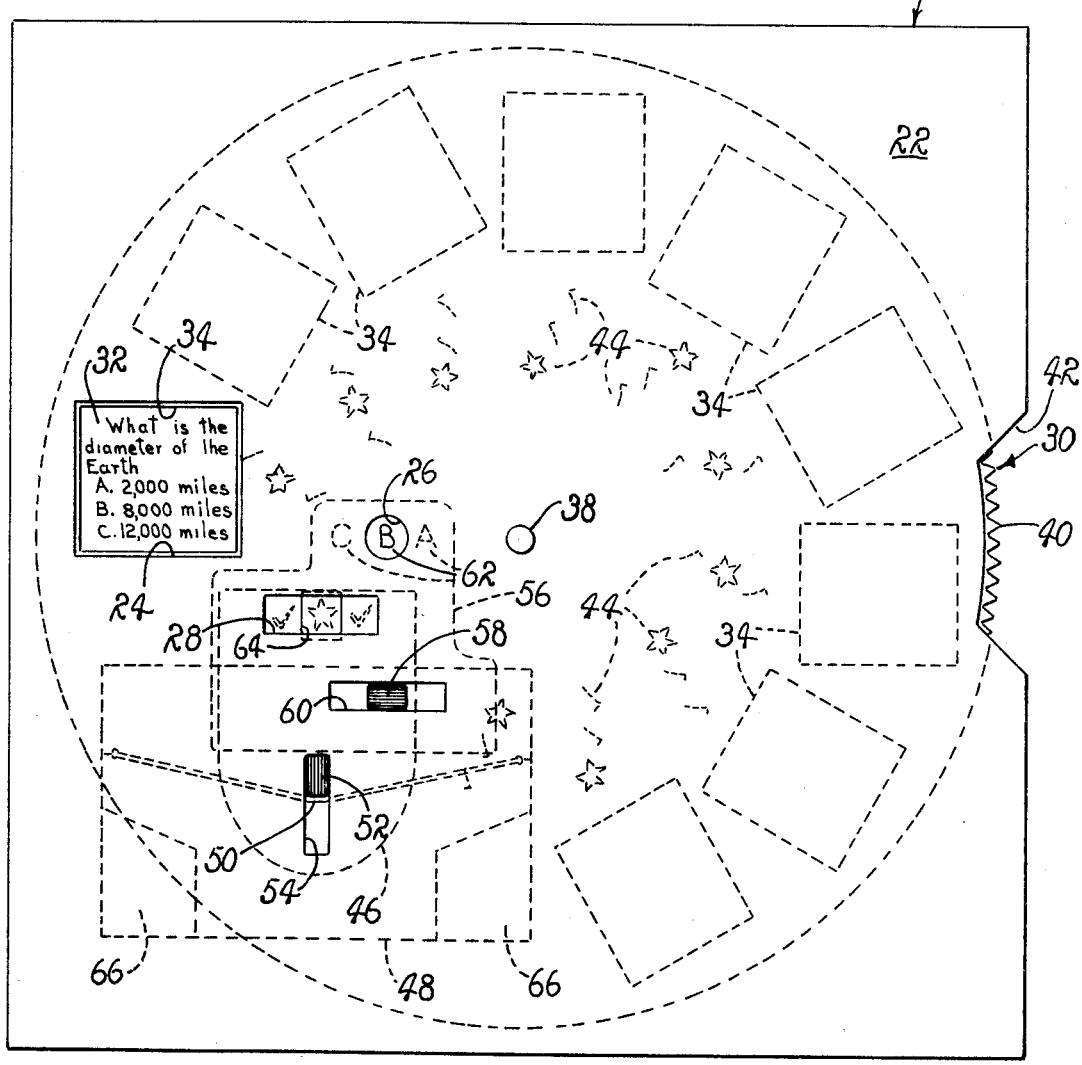
FIG. 2 is a plan view, on a larger scale, of the educational device of FIG. 1.
Figure 3:
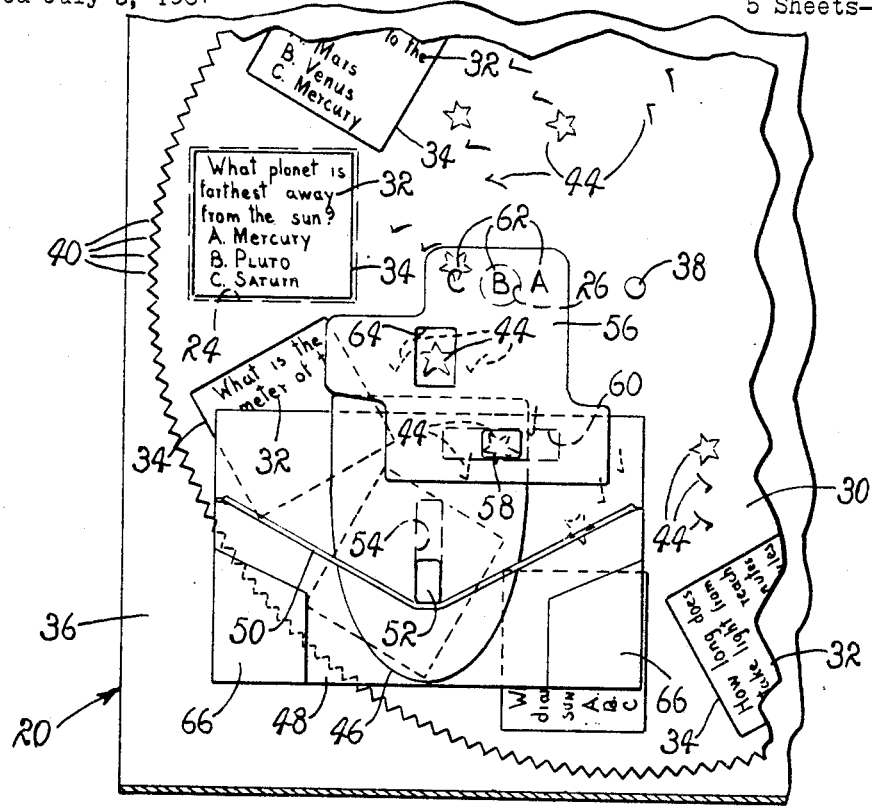
FIG. 3 is a fragmentary plan view similar to FIG. 2 but with the cover thereof removed and an answer checking slide thereof retracted to show the relationship of the parts.

Referring now to the drawings, wherein like reference characters designate like or corresponding parts throughout the several views, there is illustrated in FIG. 1 a perspective view of an educational device embodying the principles of the present invention and designated generally by reference numeral 20. Directing attention also to FIG. 2, it will be seen that device 20 includes a cover 22 having a rectangular window 24, an answer selection window 26 and an answer checking window 28. Underlying cover 22 is a sheet or body 30 of suitable material, for example, cardboard or plasticized paper or the like, which has visually represented thereon problem indicia 32, indicia 32 having a lined border 34 therearound defining a rectangular frame adapted to be placed in a registry with window 24. If desired, sheet 30 may rest upon a bottom or base layer of material 36 (FIG. 3) and be connected thereto and to cover 22 by a pin or rivet 38 for turning movement thereabout. As seen in FIG. 3, sheet or body 30 is a plate-like disk having the periphery thereof notched to provide a serrated edge 40 adapted to be manipulated for turning the disk. Cover 22 and base 36 may be of any suitable shape to accommodate disk 30, for example, rectangular, having their edges joined together to provide an envelope receiving the disk therewithin, the envelope being suitably notched as at 42 to provide access to the manipulatory serrated edge 40 of the disk 30.

Figure 4:
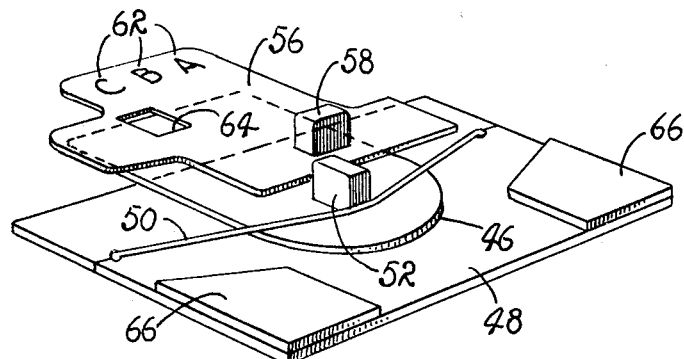
FIG. 4 is a detail perspective view showing the interrelationship of the answer selection slide and the shield masking the answer checking or correctness indicia.

Disk or body member 30 also bears answer correctness indicia 44 which may take the form of a star for a correct answer and colored check marks for incorrect answers, there being a set of such indicia adjacent the border 34 framing each problem 32 and so related thereto that when border 34 of the problem selected is in registry with window 24, the answer correctness indicia pertaining to the selected problem is in registry with window 28. However, the answer correctness indicia of the selected problem is ordinarily not visible through window 28 because it is covered over or hidden by a shield or answer checking slide 46 supported on a baseboard 48 and resiliently held in masking position by an elastic cord 50, or the like, the ends of which are suitably secured to the base, see FIG. 4. Mounted on slide 46 is finger knob 52 of generally rectangular cross section, the knob serving as the means for manipulating the slide and for guiding the slide along a predetermined path of movement for which purpose the knob projects through and is fitted to a guide slot 54 in cover 22. Knob 52 is fitted to guide slot 54 so that the side edges thereof engage the side of the knob for guiding it along a straight line path of movement, the ends of the slot determining the extent of such movement. Associated with slide 46 is another slide 56 having a finger knob 58 similar to finger knob 52 and disposed in a guide slot 60 in cover 22 which determines its path of movement but along a line transverse to the path of movement of slide 46. Best seen in FIGS. 3 and 4, slide 56 carries answer selection indicia 62, in this case, the letters A, B, C, any one of which is adapted to be placed in registration with window 26 in cover 22. Additionally, slide 56 has formed therein a window 64 which is in registration with window 28 in cover 22 the full extent of movement of the slide, but is positionable in registration with only one of the answer checking indicia symbols depending upon the answer selected. In the position of slide 56 as shown in FIG. 3, it is seen that when answer B is selected, window 64 is positioned over the star symbol and retraction of masking slide 46 uncovers the star symbol which indicates that the correct answer was selected. Of course, if one of the other answers were selected a colored check mark would show, indicating an incorrect answer. Base member 48 is provided with a pair of spacers 66 which are adapted to be cemented or otherwise suitably secured to the underside of cover 22 in proper relation to the other parts. Spacers 66 space base member 48 from cover 22 to provide a pocket therebetween which receives slides 46 and 56 and maintains them in working relation without binding.

OPERATION OF FLAT FORM

The operation of the device of the present invention is believed to be clearly apparent and is briefly summarized at this point. A disk or body member 30 is rotated by manipulation of serrated edge 40 until the indicia 32 of the problem it is desired to pose to the student appears in window 24, care being taken that border 34 framing such indicia is in proper registration with window 24. After study of the problem appearing in window 24 and an arrival at a decision as to the proper answer, knob 58 on answer selection slide 56 is then manipulated until the answer decided upon appears in window 26 and is in registry therewith. To check the answer selected, knob 52 on answer checking slide 46 is then manipulated to retract the slide and expose the answer checking indicia symbol for viewing through windows 28 and 64. If a star symbol appears, the answer selected is correct and the educational device is manipulated to present another problem to the student. If a colored check symbol appears the answer selected is not correct, knob 52 is released and slide 46 under the urging of elastic cord 50 returns to its normal masking position. The student restudies the problem and selects another answer by manipulating knob 58 to indicate such selection, after which slide 46 is again retracted. Should the answer checking symbol again be a colored check mark, the procedure is repeated until an answer is selected which produces a star symbol upon checking. Thus, the last mental impression the student has relating to the problem posed is the correct answer which is conducive to the establishment of an accurate memory bond between the problem and the proper answer or solution.

Figure 5:
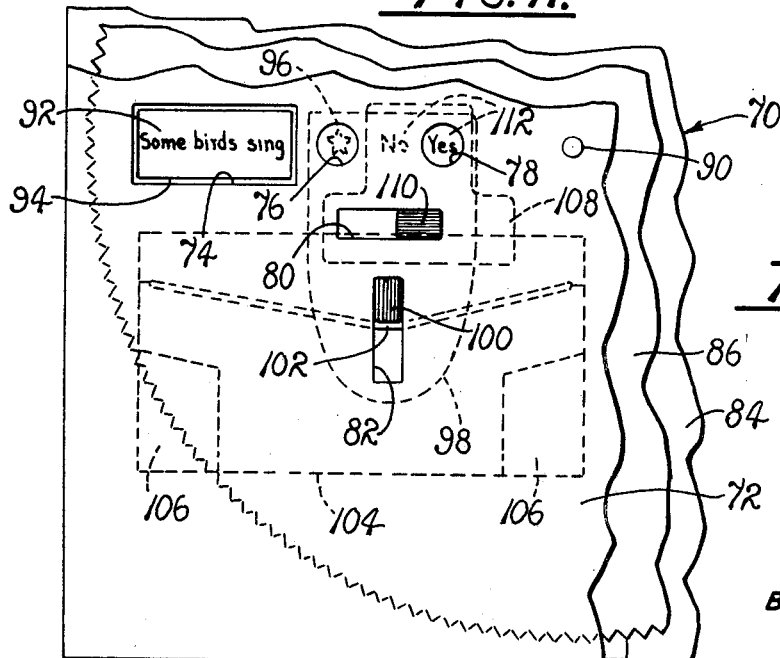
FIG. 5 is a fragmentary plan view of an educational device similar to that of FIG. 1 but which poses true-false type problems.

Turning now to FIG. 5, there is illustrated a form of the educational device, designated generally by a reference numeral 70, which poses true-false types of problems. Similar to educational device 10, device 70 has a cover 72 which has formed therein a problem window 74, answer selection windows 76 and 78 and guide slots 80 and 82. Underlying cover 72 is a bottom or base member 84 and between the two is a rotatable disk or body member 86 having a serrated edge 88. A pin 90, or other form of pivot means, passes through cover 72, disk 86 and base 84 and establishes the turning axis about which the disk rotates. Disk 86 bears problem indicia 92 encompassed by a framing border 94 and answer checking indicia 96 appropriately disposed thereon so that when disk 86 is turned to place framing border 94 in registration with window 74, a star symbol of the answer checking indicia is disposed under window 76 and a colored check mark (not shown) is disposed under window 78. The answer checking indicia 96 are normally covered by a shield or answer checking slide 98 having a finger knob 100 fitted in guide slot 82 and resiliently held in such normal position by an elastic cord 102, or the like, suitably secured to a base element 104 having spacers 106 attached thereto and cemented or otherwise secured to the underside of cover 72 to form a pocket which receives slide 98 and an answer selection slide 108 having a finger knob 110 fitted in guide slot 80. Slide 108 bears answer indicia 112 in the form of the words "YES" and "NO," or the words "TRUE" and "FALSE" could be used instead. Any other symbol denoting approval of the answer given suitable to the age group involved can be employed such as caricatures of smiling or frowning faces.

It is believed that from the foregoing the operation of this form of an educational device is apparent. However, briefly and in summary, disk 88 is manipulated through a notch (not shown) in cover 72 and bottom 84 to place a selected problem in problem window 74 and after consideration of the problem, the student manipulates slide 108 to indicate the answer selected and then checks his answer by retracting shield or slide 98 to expose one of the symbols of the answer checking indicia 96. As seen in FIG. 5, when the answer "YES" is selected it will appear through a window 78 and the colored check mark below will be covered by the slide 108 but the star symbol will not and, thus, when the answer checking slide 98 is retracted the star symbol will appear through window 76 indicating that the correct answer has been selected. It will be appreciated that when the answer "NO" is selected it will appear through window 76, the colored check mark will not be covered by slide 108 and therefore when slide 98 is retracted the check mark symbol will appear through window 78.

The form of the device in FIG. 6 is substantially similar to device 70 of FIG. 5 to the extent that items 72', 74', 80', 82', 84', 86', 94', and 98' are the substantial counterparts of the items in FIG. 5 referenced by the same, but unprimed, numerals therein and perform the same functions. It is to be noted however, that the problem indicia 92' pose a completion type problem in which any one of the word answers 112' is mentally inserted in the space underlined by line 114, evidence of which is physically indicated by manipulating finger knob 110' to position, under the word answer selected, a colored bar 116 which forms a part of an answer selection slide 108', the finger knob being attached to the slide. Slide 108' further differs from slide 108 of FIG. 5 in that it has a notch 118 formed therein so that the slide 108' covers all but one of the symbols of the answer checking indicia, not shown, which are in registry with a window 28' but normally masked by slide 98'. Thus, slide 108' masks all but a portion of window 28' and cooperates therewith to provide an aperture 120 through which the symbol of the answer checking indicia may be viewed, upon retraction of slide 98', the symbol depending upon the word answer selected by the positioning of the colored bar 116 thereunder. It will be appreciated, of course, that had the word answer "rat" been selected, viewing aperture 120 would be at the right hand end of window 28', or in the middle with the selection of the word answer "hat." It is believed that the operation of this form of the educational device is clearly apparent and a further description thereof is deemed unnecessary.

FIG. 7 relates to a form of the educational device in which the problem deals with sequential word order and includes the usual cover 72", bottom member 84", disk 86" having a serrated edge 88", guide slot 80" having fitted therein finger knob 110" attached to an answer selection guide 108", a guide slot 82" in which finger knob 100" is movable, the finger knob being attached to an answer checking slide 98". In this form, the problem indicia is presented partially on cover 72" and partially on disk 86", the unchanging portion 122 of the problem indicia is printed, or otherwise visually represented, upon a generally rectangular sticker 124 applied to the cover. Of course, portion 122 of the problem indicia could be applied directly to the cover 72", if desired. However, the use of a sticker makes for ease of manufacture. For presenting the changing portion 126 of the problem indicia, which portion is carried by disk 86", portions of the sticker and the cover are cut out to provide windows 128 and 130. The cover and sticker are similarly cut out to provide an answer selection window 132 through which the selected answer of the answer selection indicia 112' appears depending upon the positioning of the answer selection slide 108" by manipulation of finger knob 110". Slide 108" is provided with a round or circular window 134 which is so located as to register with answer checking window 76' or answer checking window 78' depending upon the selected answer, window 76' being disposed over a star symbol and window 78' being disposed over a colored check mark of answer checking indicia 96'. Thus, upon retraction of answer checking slide 98" by manipulation of finger knob 100" against the urging of elastic cord 102", the answer checking symbol may be viewed through window 134 and whichever of windows 76' or 78' with which it is in registration.

The educational devices described this far may be considered to be generally flat in form.

BOX FORM

Figure 10:
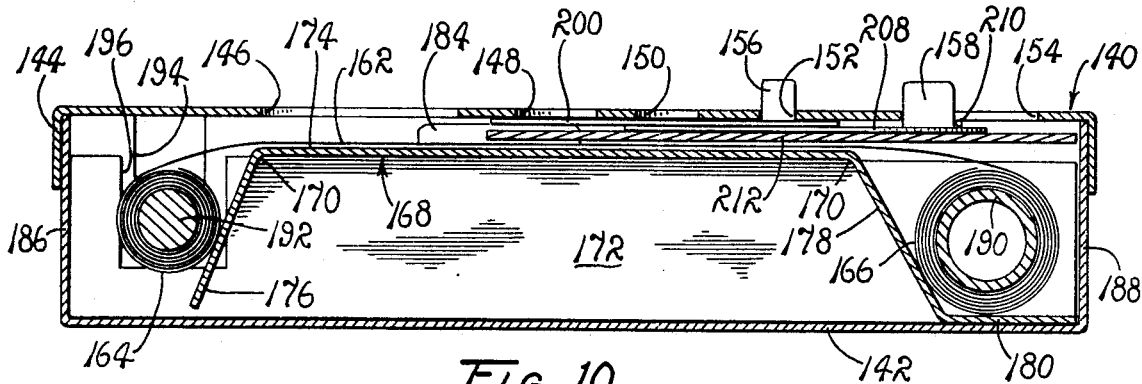
FIG. 10 is a side elevation, in section, of the device of FIG. 8.
Figure 11:
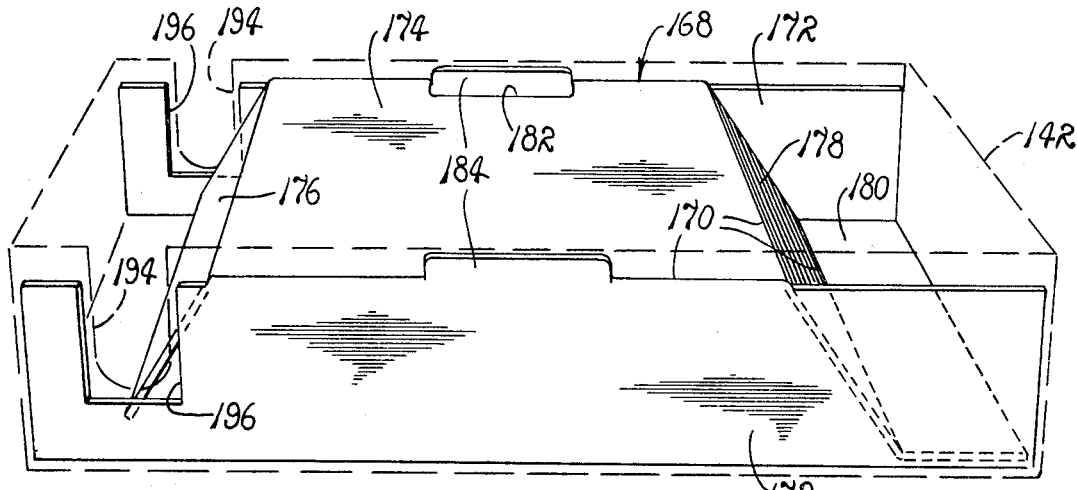
FIG. 11 is a perspective view of the paper scroll support of the device of FIG. 8 with the housing shown in phantom.

Inviting attention to FIGS. 8 through 11, an educational device of the so-called "box form" type, generally designated by reference numeral 140, will now be described. It will be seen that device 140 includes a box-like casing or housing 142 and a lid or cover 144 cut out to provide a problem window 146, an answer selection window 148, answer checking windows 150 and guide slots 152 and 154 in which finger knobs 156 and 158, respectively, are fitted. Problem indicia 160, having a framing border 161 therearound for registration with window 146, are presented by means of a scroll 162 in the form of a roll of paper, or the like, having coiled ends 164 and 166 (FIG. 10). Scroll 162 is supported within casing 142 by a contrivance designated generally by reference numeral 168 and fashioned from a generally rectangular sheet of cardboard, or the like, suitably scored and bent as at 170 to provide a pair of sides 172 which uphold, therebetween, a flat table portion 174 from the ends of which inclined portions 176 and 178 slope away, portion 178 having attached thereto a flat portion 180 adapted to rest on the bottom of casing 142, as best seen in FIG. 11, the casing being shown in phantom. Table portion 174 is notched at the sides thereof, as at 182, to provide upstanding tabs or projections 184 integral with sides 172, respectively. Sloping portion 176 cooperates with one end 186 of housing 142 to define a chamber or well which is adapted to receive the coiled end 164 of the scroll (see FIG. 10), portion 178 likewise cooperating with end 188 of the housing for receiving the coiled end 166, the flat portion intermediate the coiled ends being supported on table portion 174. Coiled end 166 may be wound about a sleeve or spool 190, end 164 being coiled about a rod or shaft 192 having ends extending beyond the edges of the roll of paper and the sides of the casing or housing 142, the latter and sides 172 being suitably notched as at 194 and 196, respectively, to accommodate the projecting ends of the shaft. Finger knobs 198 are provided on the ends of shaft 192 for turning the same and moving the paper across table portion 174 in order to register any problem desired with window 146 for presenting the problem to the student. If desired, sleeve 190 could be replaced with a shaft similar to shaft 192 for moving the paper in the opposite direction. Although roller shaft means have been described for moving the paper, nevertheless it is to be understood that any other means could serve as well. Tabs 184 serve as spacers, the tops thereof being engaged by the lid or cover 142 to insure that there is adequate space between the underside of the cover and the top of table portion 174 for passage of the paper of scroll 162.

Referring now to FIG. 9, it will be seen that associated with window 148 is an answer selection slide 200 which has thereon answer selection indicia 202 and is attached to finger knob 156 for manipulation thereby. Slide 200 also has a circular window 204 formed therein adapted to be positioned over one of a plurality of symbols constituting answer checking indicia 206 ordinarily covered by a shield or answer checking slide 208 held in place by an elastic cord 210, the ends of which are suitably secured to a base element 212 having bonded thereto a pair of disk like spacers 214 which in turn are bonded or otherwise secured to the underside of lid or cover 144 for providing a pocket which receives slides 200 and 208, base 212 being suitably notched as at 216 so as not to cover over or mask answer checking indicia 206.

OPERATION OF BOX FORM

In the operation of the box form of the educational device of the present invention, finger knobs 198 are manipulated to move the paper of scroll 162 until the indicia of the selected problem is presented through window 146. The student then ponders the problem and selects his answer, in this case a multiple choice answer, by manipulating finger knob 156 to display the selected answer in window 148 which serves to position window 204 in slide 200 over the answer checking indicia symbol which pertains to the answer selected. The student then manipulates finger knob 158 for moving shield or slide 208 to check the accuracy of his answer, elastic cord 210 returning slide 208 to normal covering position upon a release of the finger knob.

FIG. 12 illustrates a device 140' which is a modification of the box form of educational device illustrated and described in connection with FIGS. 8 through 11, the primed numerals in FIG. 12 being directed to the counterparts of items which bear unprimed numerals in FIGS. 8 through 11. It is further to be understood that device 140' is provided with a contrivance similar to contrivance 168 for support of the ends and intermediate portion of scroll 162' and that there is provided a shaft 192' attached to the scroll whereby it may be moved by manipulation of finger knobs 198'. Device 140' is for the purpose of teaching the sequential order of phrases or clauses as they appear in a statement or a poem, or the like, and it differs from device 140 in that discrete portions 160" of the problem indicia 160' are simultaneously presented through windows 218, 220 and 222 formed in cover 144', each portion 160" having thereabout a framing border 161" for registration with its respective window. It is to be noted that in this form of the educational device there are three answer selection slides 224, 226 and 228, each generally rectangular in form and having attached thereto a finger knob 230, 232 and 234, respectively, each slidable in a guide slot 236, 238 and 240, respectively. Each of the answer selection slides bears answer selection indicia, in this case, numerals 1, 2 and 3, any one of which is positionable in registration with a window in the cover according to the answer selected, which also positions a window in the answer selection slide over one of a plurality of symbols of answer checking indicia. Thus, slide 224 is associated with a round window 242 in cover 144' and is formed with a square window 244 which is in registry with a rectangular window 246 in the cover, window 246 framing answer checking indicia 248 on scroll 162'. In like manner, slide 226 has a window 244' and is associated with windows 242' and 246' and answer checking indicia 248', and slide 228 has a window 244" and is associated with windows 242" and 246" and answer checking indicia 248". An answer checking slide 250, having the general form of a T with a wide top and a stubby stem, normally covers the answer checking indicia 248, 248' and 248" and is held in such position when at rest by an elastic cord 210'. Mounted on slide 250 is a finger knob 252 fitted in a guide slot 254 in cover 144'.

In the operation of the device of FIG. 12, after the problem has been posed and pondered, finger knobs 230, 232 and 234 are manipulated to indicate the decided sequential order of the discrete portions 160" of the problem after which slide 250 is retracted for checking the answers. If all three star symbols are not uncovered, the procedure is repeated until the answers selected produce a showing of all three star symbols.

There have thus been provided educational devices which stimulate the interest of the student and motivate him to learn, and are conducive to the establishment of memory bonds between the problems posed and the correct answers thereto.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described the invention, what I claim and desire to secure by Letters Patent is:

1. An educational device comprising
   (A) cover means having windows therein;
   (B) movable body means having visually represented thereon problem indicia with answer correctness indicia and adapted to be moved for placing the problem indicia in registry with one of said windows and simultaneously placing answer correctness indicia in registry with another of said windows;
   (C) answer selection means mounted for movement and having masking means masking only a portion of said answer correctness indicia and leaving the remainder thereof unmasked according to the answer selected; and
   (D) answer checking means mounted for movement from a position normally hiding said unmasked remainder of said answer correctness indicia from view to a position where the same may be viewed through said answer correctness window for checking the correctness of the answer selected.

2. The device as defined in claim 1 wherein said answer selection means and said answer checking means each have a path of movement transverse with respect to the other.

3. The device as defined in claim 2 wherein said path of movement of said answer selection means is along a straight line.

4. The device as defined in claim 3 wherein said path of movement of said answer checking means is perpendicular to the path of movement of said answer selection means.

5. The device as defined in claim 1 wherein said movable body means comprises a rotatable plate.

6. The device as defined in claim 1 wherein said movable body means comprises a roll of material.

7. An educational device comprising
   (A) a cover having windows and guide slots therein;
   (B) movable material underlying said cover having thereon a plurality of serially arranged problems and adjacent thereto answer correctness indicia;
   (C) means for moving said material for placing a selected one of said problems in registry with one of said windows and for placing answer correctness indicia relating to the selected problem in registry with another of said windows;
   (D) answer selection means mounted for movement defined by one of said guide slots having masking means masking all but a portion of said answer correctness indicia in accordance with the answer selected; and
   (E) a shield mounted for movement defined by another guide slot normally masking said answer correctness window and adapted to be moved for unmasking the same and exposing the unmasked portion of said answer correctness indicia for checking the correctness of the answer selected.

8. The device as defined in claim 7 wherein
   said movable material comprises a rotable plate pivoted to said cover; and
   said means for moving said material comprises a serrated edge on said plate.

9. The device as defined in claim 7 wherein
   said movable material comprises a roll of paper having coiled ends with a flat portion therebetween; and
   said means for moving said material comprises a manipulatable roller supported in a housing.

10. The device as defined in claim 7 wherein
    said answer selection means has a protuberance projecting through its associated guide slot, said protuberance having sides bearing against the edges of the associated slot for guiding the answer selection means and ends for defining the extent of its movement; and
    said shield has a similar protuberance projecting through its associated guide slot for guiding and defining the extent of movement of the shield.

11. In an educational device of the character described the combination comprising:
    (A) an answer selection slide adapted to be selectively moved to any one of a plurality of positions, each position being identified by answer selection indicia and serving to designate one answer of a plurality of answers for a given problem;
    (B) answer correctness indicia, a portion of which is associated with each position of said plurality of positions and serves to indicate the correctness of the answer designated by the position;
    (C) masking means masking all but the portion of said answer correctness indicia associated with the position to which the slide is moved; and
    (D) movable answer checking means normally disposed in a position obscuring said portion of the answer correctness indicia and retractable therefrom for displaying said portion.

12. The combination as defined in claim 11 wherein said answer checking means has manipulatory means for retracting it from said normal masking position and resilient means for returning it to such position.

13. The combination as defined in claim 12 wherein said manipulatory means is disposed in a guide slot for determining the extent of movement of said answer checking means.

14. The combination as defined in claim 13 wherein said answer selection slide is provided with manipulatory means disposed in a guide slot for determination of its path of movement.

15. The combination as defined in claim 14 wherein said guide slots are disposed generally perpendicular to each other.

References Cited

UNITED STATES PATENTS

| | | | |
|---|---|---|---|
| 1,414,857 | 5/1922 | Brandvein | 35—74 |
| 1,867,888 | 7/1932 | Obidine | 35—9.1 |
| 1,974,901 | 9/1934 | Stadler | 35—75 X |
| 3,136,074 | 6/1964 | Hawkins | 35—9 |

WILLIAM H. GRIEB, Primary Examiner